US012638752B1

(12) United States Patent
Sheridan et al.

(10) Patent No.: US 12,638,752 B1
(45) Date of Patent: May 26, 2026

(54) PLURALITY OF OPTICAL CENTERS IN A UNIFIED FREE FORM, HEMISPHERICAL OPTIC

(71) Applicant: Apple Inc., Cupertino, CA (US)

(72) Inventors: Ryan M. Sheridan, Huntington Beach, CA (US); Benjamin D. Buckner, Irvine, CA (US)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 18/469,692

(22) Filed: Sep. 19, 2023

Related U.S. Application Data

(60) Provisional application No. 63/376,941, filed on Sep. 23, 2022.

(51) Int. Cl.
G03B 17/08 (2021.01)
(52) U.S. Cl.
CPC .................................... G03B 17/08 (2013.01)

(58) Field of Classification Search
CPC ...................................................... G03B 17/08
See application file for complete search history.

(56) References Cited

U.S. PATENT DOCUMENTS

| | | | | |
|---|---|---|---|---|
| 2005/0259985 A1* | 11/2005 | Mulvey | ................ | G03B 17/565 |
| | | | | 396/427 |
| 2018/0146122 A1* | 5/2018 | Campbell | .............. | H04N 23/55 |
| 2021/0193721 A1* | 6/2021 | Kim | ...................... | G01J 1/0488 |
| 2025/0076621 A1* | 3/2025 | Bowron | ................. | G02B 13/18 |

* cited by examiner

*Primary Examiner* — Mariam Qureshi
(74) *Attorney, Agent, or Firm* — Blank Rome LLP

(57) ABSTRACT

Systems and optical devices for providing a unified free form optic are described. An optical element is used as a structural barrier and lens on an underwater camera system. The optical element is configured to overlay a plurality of lens stacks and is composed of a single, seamless material having a plurality of domes each configured to overlay an individual camera in a multi-camera system. The single free form optic includes multiple optical centers that each preserve the optical properties of a single dome, while being manufactured as a single solid element.

20 Claims, 6 Drawing Sheets

PLURALITY OF OPTICAL CENTERS IN A UNIFIED FREE FORM, HEMISPHERICAL OPTIC

BACKGROUND

This disclosure relates generally to the field of image capture, and more specifically to the field of an optical device having a plurality of optical centers.

Camera capture technology allows for images to be captured in various environments. When capturing images underwater, typically the camera system must be protected from the water. As an example, a camera may be encased in a waterproof housing which protects the electrical and optical components from water exposure. In some embodiments, a barrier specific to the lens may be provided, for example in the case of a dome port. A dome port may be configured to act as a barrier between a lens stack and a water environment. In addition, a dome port may be used to address distortion caused by being submerged in water. However, traditional dome ports can be quite large and cumbersome.

DETAILED DESCRIPTION

Figure 1:
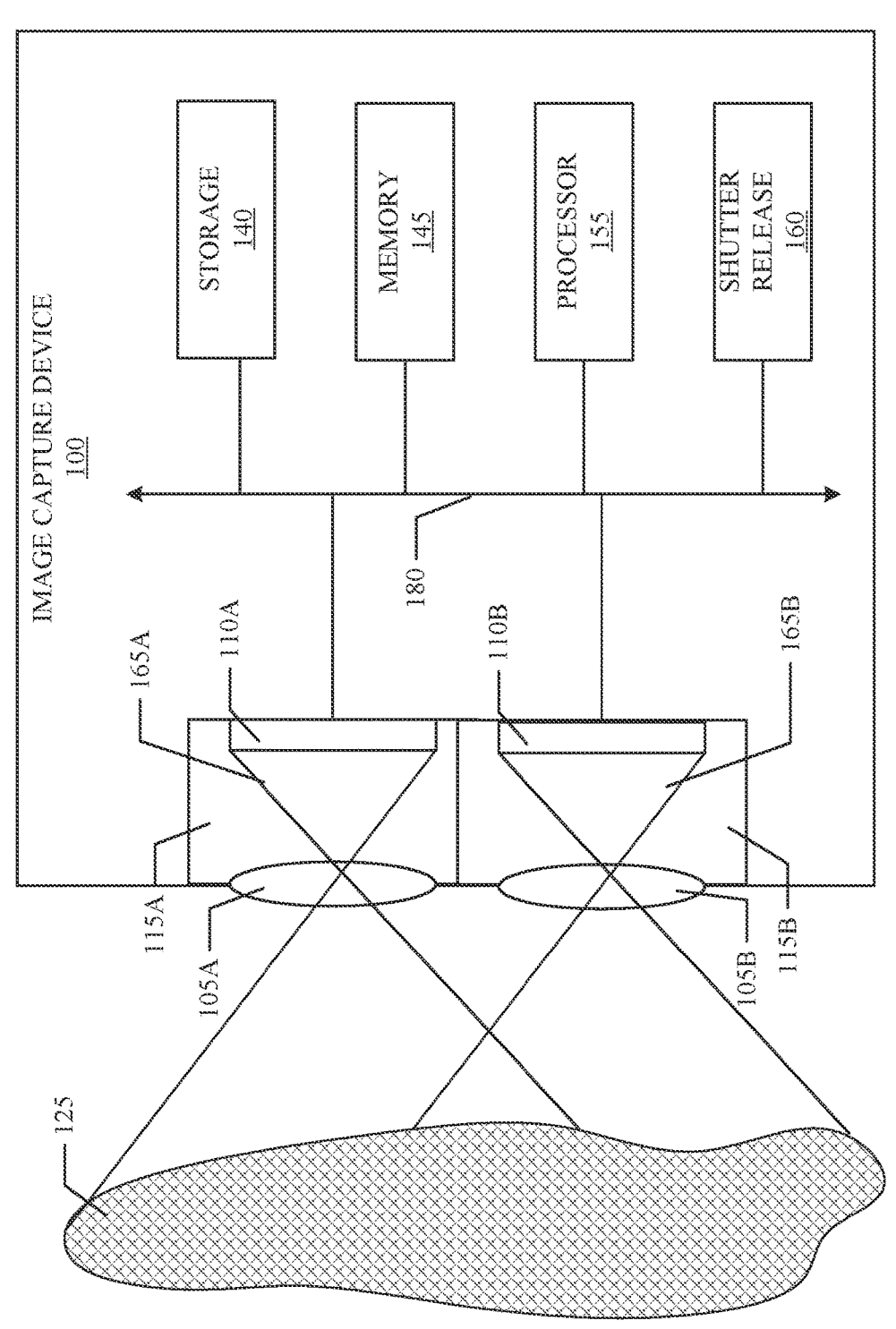
FIG. 1 shows, in block diagram form, a simplified electronic device having a plurality of cameras, according to one or more embodiments.

This disclosure is directed to systems and optical devices for providing a unified free form optic. In general, embodiments described herein relate to an optical element uses a structural barrier and lens on an underwater camera system. In particular, embodiments described herein relate to an optic element configured to overlay a plurality of lens stacks and comprising a single, seamless material having a plurality of domes each configured to overlay an individual camera in a multi-camera system. In some embodiments, the single free form optic includes multiple optical centers that each preserve the optical properties of a single dome, while being manufactured as a single solid element.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses. In one or more embodiments, the lens may be moved to various positions to capture images at multiple depths and, as a result, multiple points of focus. Further in one or more embodiments, the lens may refer to any kind of lens, such as a telescopic lens or a wide angle lens. As such, the term lens can mean a single optical element or multiple elements configured into a stack or other arrangement.

For purposes of this disclosure, the term "camera" refers to a single lens assembly along with the sensor element and other circuitry utilized to capture an image. For purposes of this disclosure, two or more cameras may share a single sensor element and other circuitry, but include two different lens assemblies. However, in one or more embodiments, two or more cameras may include separate lens assemblies as well as separate sensor elements and circuitry.

For purposes of this disclosure, the term "multicamera device" refers to a single device in which multiple cameras are incorporated. The set of multiple cameras may be configured to capture images individually, concurrently, or some combination thereof.

Referring to FIG. 1, a simplified block diagram of an image capture device 100 is depicted, in accordance with one or more embodiments of the disclosure. Image capture device 100 may be part of a mobile electronic device, such as a tablet computer, mobile phone, laptop computer, portable music/video player, or any other electronic device that includes a camera system. Further, in one or more embodiments, image capture device 100 may be part of any other multifunction device that includes multiple cameras, such as those described below with respect to FIG. 6.

The image capturing device 100 includes, but is not limited to, a plurality of camera module 115A-B, a shutter release 160, storage 140, a memory 145 and a processor 155. The processor 155 may drive interaction between a plurality of the components comprising device 100. The processor 155 may be any suitably programmed processor within device 100.

In some embodiments, the processor 155 may be a primary processor such as a microprocessor or central processing unit. The processor 155 may communicate with the other illustrated components across a bus 180. The bus 180 can be any subsystem adapted to transfer data within the device 100. The bus 180 can be a plurality of computer buses and include additional circuitry to transfer data and generally facilitate inter-component communication (e.g., a switch).

Turning to the camera module 115A-B, each camera module 115 incorporates many of the components utilized to capture an image, such as a lens 105 and an image sensor 110. As such, camera module 115A includes a lens 105A and image sensor 110A, while camera module 115B includes a lens 105B and an image sensor 110B. In some embodiments, at least one of camera modules 115A and 115B features a wide field of view, such as with a wide-angle lens. However, the lens 105 may offer different fields of view in embodiments wherein the lens is a telescopic lens or an ultra-wide angle lens. Further, the plurality of camera modules 115 may feature some combination of lenses.

Each camera module may include an image sensor 110. The image sensor may include, for example, a charge-coupled device (CCD) or complementary metal-oxide-semi-conductor (CMOS) sensor. The image sensor 110 collects electrical signals during a capture period as a representation of the light traveling to image sensor 110 along an optical path 165 so that a scene 125 can be captured as an image. Because image capture device 100 includes a multi-camera system, each lens may be associated with a separate image sensor 110. Alternatively, in some embodiments, at least some of the lenses may be associated with a common image sensor. In the example shown, camera module 115A may capture a first image of scene 125 by capturing, by sensor 110A, light traveling along optical path 165A. Similarly, camera module 115B may capture a second image of scene 125 by capturing, by sensor 110B, light traveling along optical path 165B. The images captured by sensor 110A and sensor 110B may be unique to each other given the variations and optical paths. Although to camera modules are depicted in image capture device 100, it should be understood that any number of camera modules may be present in the image capture device 100. Further, although camera module 115A and camera module 115B are depicted as a stereo camera system in which two cameras are implemented in the capture device adjacent to each other, it should be understood that any number of cameras may be present in any configuration on one or more services of the image capture device 100.

A shutter release 160 can effect a capture period of the image sensors 110. The shutter release 160 can be a component activated by a user, such as a tactile button provided on the housing of the image capturing device 100. Alternatively, or in addition to a tactile input, the shutter release 160 may be presented to the user through an interface such as a touch input of the display screen (not shown), as is common in cellular telephones, mobile media devices, and tablet computers. The shutter release 160 can be triggered through other means as well, such as by a timer or other triggering event. A single trigger of the shutter release 160 may result in a plurality of capture periods, e.g. actuation of the shutter release 160 only once may result in the image sensor 110 capturing a plurality of separate images.

The image capturing device 100 includes storage 140 that may be operable to store one or more images captured by image sensors 110. Storage 140 may be volatile memory, such as static random access memory (SRAM) and/or dynamic random access memory (DRAM). Alternatively, or in addition to volatile memory, storage 140 may include non-volatile memory, such as read-only memory (ROM), flash memory, and the like. Furthermore, storage 140 may include removable storage devices, such as secure digital (SD) cards. Storage 140 may additionally provide storage of computer readable instructions, data structures, application modules, and other data for image capturing device 100. Accordingly, while storage 140 is illustrated as a single component, storage 140 may comprise a plurality of separate components (e.g., RAM, flash, removable storage, etc.).

According to some embodiments, in order for the image capture device 100 to perform underwater, a barrier may be needed between the lenses 105 and the aqueous environment. According to some embodiments, this barrier may be provided in the form of an optic which not only acts as a barrier, but also a lens on the lens stack. A single free-form optic may be overlaid over all of the lenses 105, with a plurality of domes each configured to preserve the optical properties of a single optical dome over the corresponding lens stack, while the single free-form optic is provided as a single, solid element. The optical properties of the free form optic may be controlled by many means, such as but not limited to surface curvature, bulk refractive index, refractive index gradients, or diffractive patterns imposed on the surface or interior of the element, or the like.

Figure 2:
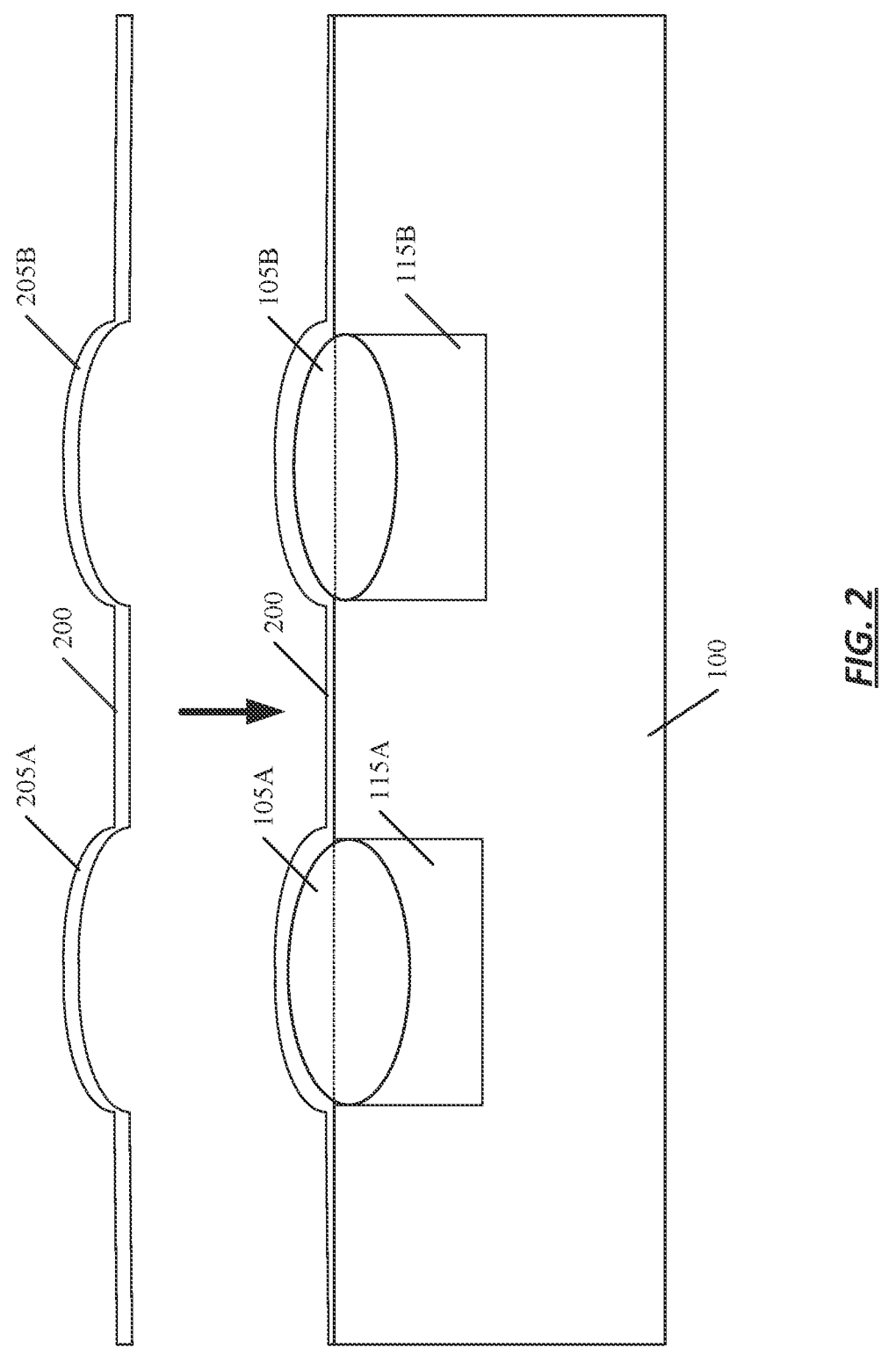
FIG. 2 shows an example diagram of an optical device, according to one or more embodiments.

Turning to FIG. 2, a singular optic 200 comprising multiple domes 205A and 205B is presented. According to some embodiments, the optic may be configured to sit over a plurality of lenses, such that each of the lenses is fit within one of the plurality of domes 205. That is, in some embodiments, each of domes 205A and 205B is configured to overlay a lens stack, such as lens 105A and 105B. Each of the domes 205 sits over the camera module 115 in such a manner as to preserve the optical properties of the underlying camera module 115. As such, the domes of the singular barrier become part of the optical assembly of each of the camera modules 115.

In some embodiments, the singular optic 200 is manufactured as a single element, such that the singular optic 200 acts as a barrier between the lenses 105 and an environment, such that if the image capture device 100 is submerged in an aqueous environment, the singular optic 200 acts as a barrier. For example, the singular optic 200 may be manufactured from a single piece of material and thus includes no seams, glue, or other joining materials. The singular optic 200 is manufactured to retain its form and structural integrity when submerged. As such, the thickness of the singular optic 200 may be based on the water pressure it must endure. The singular optic 200 may be manufactured from any suitable material, such as BK7 glass or synthetic sapphire glass.

According to one or more embodiments, the singular optic 200 is configured to overlay the lenses 105 such that the plurality of domes 205 on the singular optic 200 abut the corresponding lens stacks. In doing so, the singular optic 200 acts not only as a barrier to the camera modules 115, but also acts as a lens as part of each lens stack for the various camera modules 115. Accordingly, if the camera modules 115 are arranged along a flat surface, then the singular optic 200 may be substantially flat (with the exception of the domes configured to fit the various cameras). Similarly, if the camera modules 115 are arranged along a curved surface, then the singular optic 200 may be manufactured in a curved manner, with the domes comprising additional curvatures within the singular optic 200. The curvature of each of the domes matches the curvature of an underlying lens. In addition, the domes are configured to sit over the lens stack of each camera module in such a manner that an optical center is maintained. According to some embodiments, the singular optic 200 may be a removable optic such that the singular optic 200 can be removable, and act as a housing to the underlying multicamera system when attached to the image capture system 100. In doing so, the optical axis for each camera of the multicamera system such that the optical axes are invariant with regard to whether the dome is immersed in water air.

Figure 3:
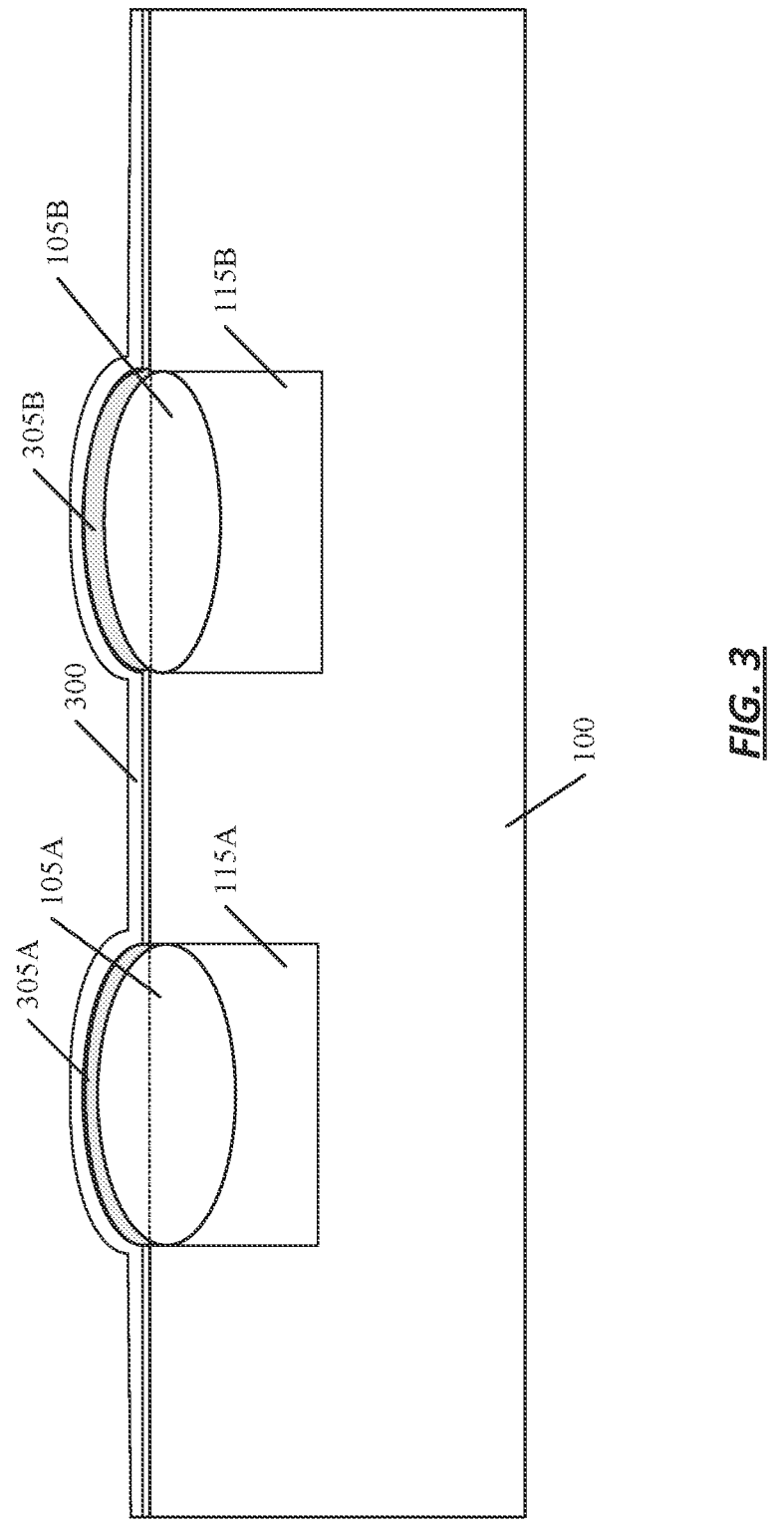
FIG. 3 shows an alternative example diagram of an optical device, according to one or more embodiments.

Referring to FIG. 3, in some embodiments, the singular optic may be configured to be permanently attached to the image capture device 100. In these embodiments, the singular optical element 300 may be married to the image capture device 100 such that the image capture device 100 and the singular optic 300 form an enclosed system. An optical joining material 305 may be provided between the lenses 105 and the singular optic 300 to bond the singular optic 300 mechanically or optically to the lenses. The joining material 305 may include, for example, an optical adhesive, cement, or oil. The optical joining material 305 can be selected to have a specific refractive index to optimize optical properties of the system in relation to the singular optic 300 as part of the optical design process.

Figure 4:
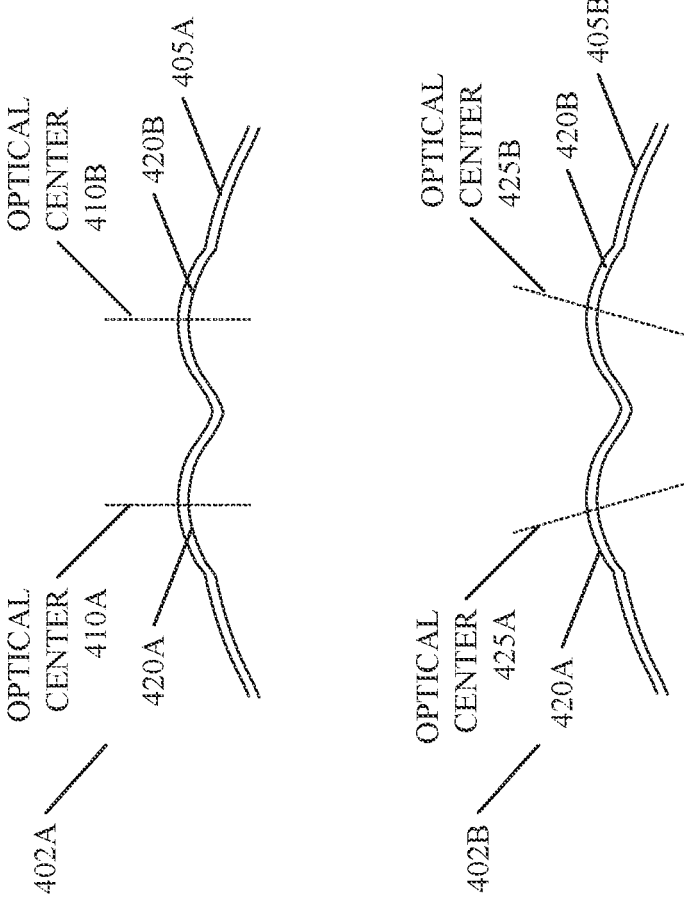
FIG. 4 shows a diagram of a cross section of an optical device, according to one or more embodiments.
Figure 4:
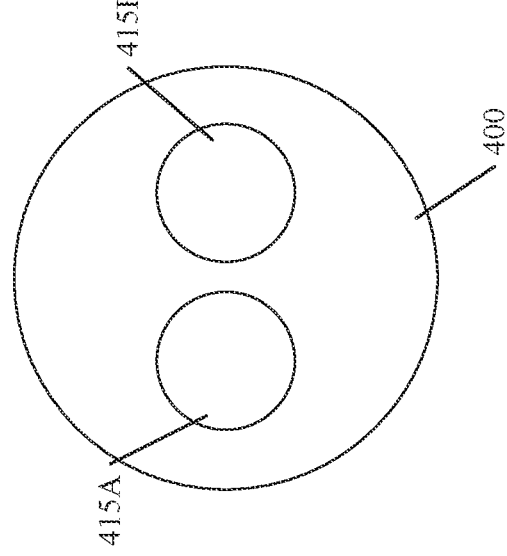

FIG. 4 shows a diagram of a cross section of an optical device, according to one or more embodiments. FIG. 4 depicts an overhead view of an image capture device 400 having a multicamera system, where the multicamera system is configured along a curved surface. The multicamera system includes a first camera 415A and a second camera 415B. The image capture device 400 may have a singular optic 405 overlaid over the multi-camera system. Diagram 402A shows a first optional cross-section diagram of a singular optic 405A overlaid on device 400. The domes of the singular optic include a first number 420A configured to overlay camera 415A, and a second dome 420B configured to overlay camera 415B. In the implementation shown at 402A, the optical centers for each camera in the multi-camera system may be parallel to each other. Thus, dome 420A corresponds to optical center 410A, while dome 420B corresponds to optical center for 410B, which is parallel to optical center 410A. As such, if the cameras 415 are incorporated into the image capture device 400 in such a manner that the optical centers are parallel to each other, then even if the singular optic or is configured to fit on a curved surface, the domes 420 can be configured to maintain parallel optical centers across the multi-camera system. In some embodiments, the optical centers are parallel to each other to maintain a distance corresponding to an interpupillary distance, such as 64 millimeters of separation.

In some embodiments, the multi-camera system may have cameras embedded in an image capture device in such a way that the optical axis of each of the cameras are configured to converge at a single point. Thus, in diagram 402B, dome 420A corresponds to optical center 425A, while dome 420B corresponds to optical center 410B, which is parallel to optical center 410A. As such, if the cameras 415 are incorporated into the image capture device 400 in such a manner that the optical centers are parallel to each other, then even if the singular optic or is configured to fit on a curved surface, the domes 420 can be configured to maintain orthogonal optical centers across the multi-camera system.

In further embodiments, the optical axes associated with the optical centers of the various domes may have any relationship. As such, the domes 420A and 420B can be designed with optical axes to any suitable relationship, and/or configuration on the optic.

Figure 5:
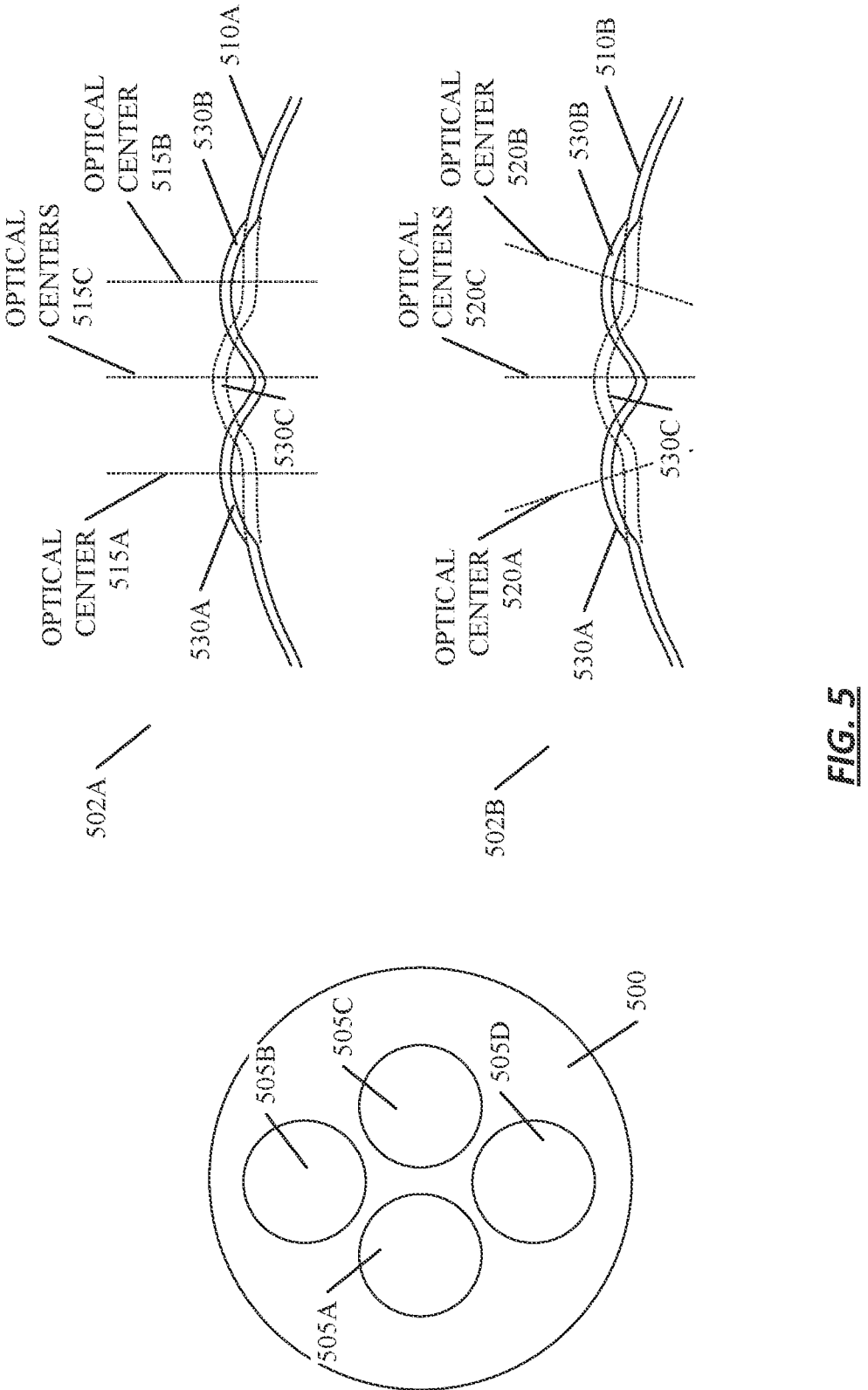
FIG. 5 shows a diagram of an alternative cross section of an optical device, according to one or more embodiments.

FIG. 5 shows a diagram of an alternative cross section of an optical device, according to one or more embodiments. Similar to FIG. 4 above, FIG. 5 shows a multicamera system in depicts an overhead view of an image capture device 500 having a multicamera system, where the multicamera system is configured along a curved surface. The multicamera system includes a first camera 505A, a second camera 505B, a third camera 505C, and a fourth camera 505D arranged on a curved surface. The image capture device 500 may have a singular optic 405 overlaid over the multi-camera system. Diagram 502A shows a first optional cross-section diagram of a singular optic 510A overlaid on device 500. The domes of the singular optic include a first dome 530A configured to overlay camera 505A, and a second dome 535B configured to overlay camera 505C. In addition, the cross section 502A shows a representation of two domes at 540C which are configured to overlay cameras 505B and 505D.

In the implementation shown at 502A, the optical centers for each camera in the multi-camera system may be parallel to each other. Thus, dome 530A corresponds to optical center 515A, while dome 530B corresponds to optical center for 515B, which is parallel to optical center 515A. In addition, the diagram 502A shows a representation 530C of the cross sectional view of the two comes corresponding to cameras 505B and 505D, which are associated with additional optical centers 515C corresponding to optical centers parallel to optical centers 515A and 515B. As such, if the cameras 415 are incorporated into the image capture device 400 in such a manner that the optical centers are parallel to each other, then even if the singular optic or is configured to fit on a curved surface, the domes 530 can be configured to maintain parallel optical centers across the multi-camera system. In some embodiments, the optical centers are parallel to each other to maintain a distance corresponding to an interpupillary distance, such as 64 millimeters of separation.

In some embodiments, the multi-camera system may have cameras embedded in an image capture device in such a way that the optical centers of each of the cameras are orthogonal to each other. Said another way, the optical centers may be configured to converge at a single point paragraph more specifically, raise corresponding to the optical centers may converge at a single point. Thus, in diagram 502B, dome 530A corresponds to optical center 520A, while dome 530B corresponds to optical center 520B, which is orthogonal to optical center 520A. Similarly, the representation 520C of the optical centers of the domes covering cameras 505B and 505D are also orthogonal to optical centers 520A and 520B. Accordingly, the rays of each of the optical centers 520 would converge to a single point. As such, if the cameras 505 are incorporated into the image capture device 500 in such a manner that the optical centers are orthogonal to each other, then even if the singular optic 510 is configured to fit on a curved surface, the domes 530 can be configured to maintain orthogonal optical centers across the multi-camera system.

Figure 6:
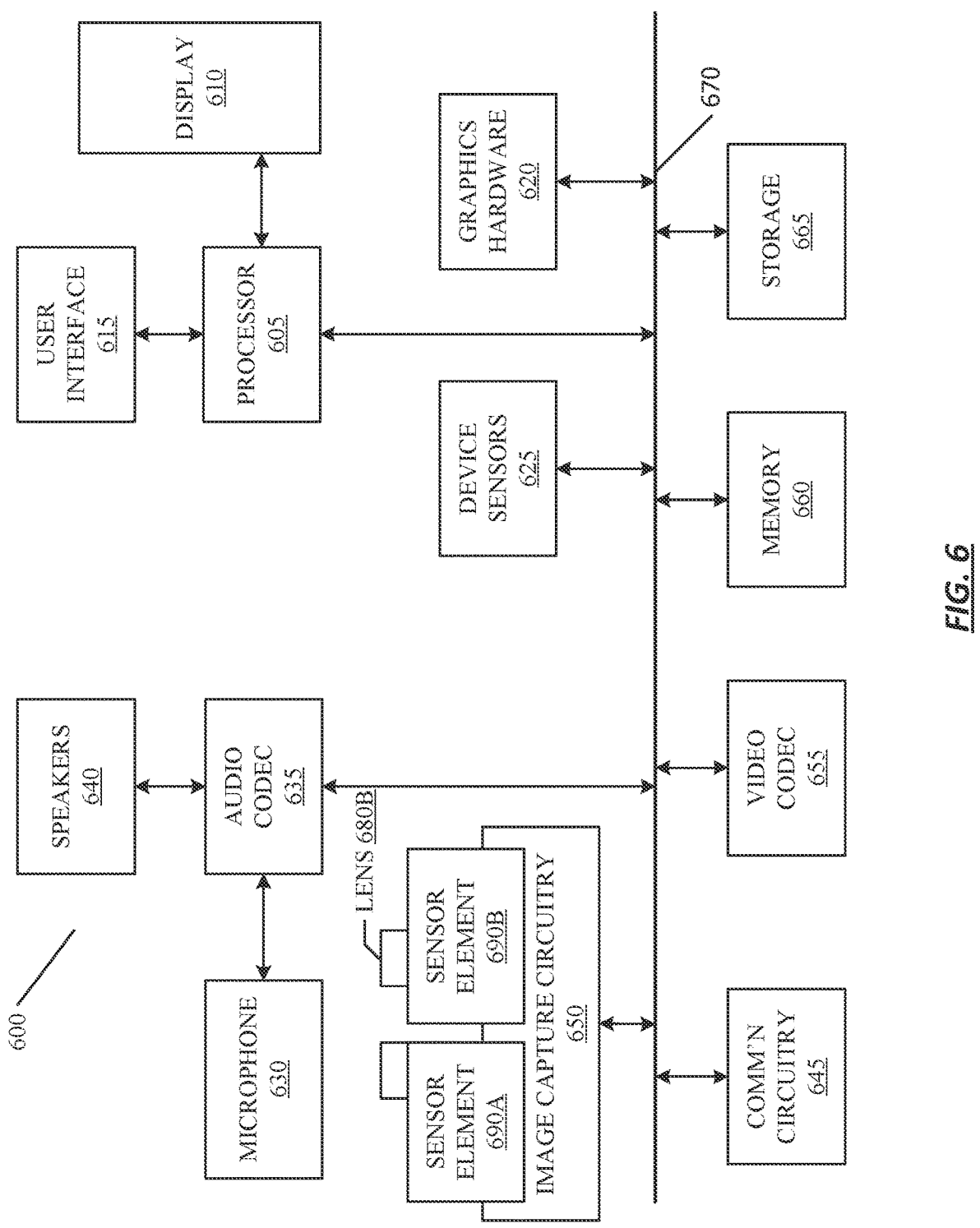
FIG. 6 shows, in block diagram form, a simplified multifunctional device according to one or more embodiments.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, event capture circuitry 650 (e.g., including camera system) video codec(s) 655 (e.g., in support of event capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Event capture circuitry 650 may scan rows and columns of pixels to detect whether those pixels have detected brightness changes. If events are detected, the event capture circuitry 650 assigns timestamps to the event, and transmits the events over the bus. In one or more embodiments, the image capture circuitry 650 may perform event compression, noise filtering, and the like prior to transmission. Events so captured may be stored in memory 660 and/or storage 655.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An optical device, comprising:
an optic comprising a plurality of domes, each of the plurality of domes configured to overlay a lens stack,
wherein each of the plurality of domes has an optical center coincident with an optical center for a corresponding lens stack.

2. The optical device of claim 1, wherein the optic is manufactured as a single element.

3. The optical device of claim 1, wherein the plurality of domes are configured to concurrently abut a set of corresponding lens stacks.

4. The optical device of claim 1, wherein the plurality of domes are configured to affix to the corresponding lens stacks, and wherein an material of selected refractive index is provided between the lens stack and the dome.

5. The optical device of claim 1, wherein a plurality of axes corresponding to the optical centers for the plurality of domes are parallel to each other.

6. The optical device of claim 1, wherein a plurality of axes corresponding to the plurality of optical centers converge at a single point.

7. The optical device of claim 1, wherein the optical axes of each of the plurality of domes is invariant with respect to an immersive medium.

8. The optical device of claim 1, wherein at least one of the lens stacks corresponds to a wide angle lens.

9. The optical device of claim 1, wherein the plurality of domes is configured to overlay a stereo camera.

10. The optical device of claim 1, wherein the optic is configured to overlay a curved surface comprising the plurality of lens stacks.

11. An optical system, comprising:
a plurality of lens stacks affixed to a device; and
an optic comprising a plurality of domes, each of the plurality of domes configured to overlay one of the plurality of lens stacks,
wherein each of the plurality of domes has an optical center coincident with an optical center for the corresponding lens stack.

12. The optical system of claim 11, wherein the optic is manufactured as a single element.

13. The optical system of claim 11, wherein the plurality of domes are configured to concurrently abut the plurality of lens stacks.

14. The optical system of claim 11, further comprising:
an index matching material provided between each of the domes and a corresponding lens stack.

15. The optical system of claim 11, wherein a plurality of axes corresponding to the optical centers for the plurality of domes are parallel to each other.

16. The optical system of claim 11, wherein a plurality of axes corresponding to the plurality of optical centers converge at a single point.

17. The optical system of claim 11, wherein the optical axes of each of the plurality of domes is invariant with respect to an immersive medium.

18. The optical system of claim 11, wherein at least one of the lens stacks corresponds to a wide angle lens.

19. The optical system of claim 11, wherein the plurality of domes is configured to overlay a stereo camera.

20. The optical system of claim 11, wherein the plurality of lens stacks are affixed in the optical system along a curved surface.

* * * * *